(12) United States Patent
Morgan et al.

(10) Patent No.: US 10,855,616 B2
(45) Date of Patent: Dec. 1, 2020

(54) PREDICTING WAIT TIME FOR NEW SESSION INITIATION DURING INCREASED DATA TRAFFIC LATENCY

(71) Applicant: Sony Interactive Entertainment LLC, San Mateo, CA (US)

(72) Inventors: N. Blaine Morgan, Los Angeles, CA (US); Charles McCoy, San Diego, CA (US); True Xiong, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 213 days.

(21) Appl. No.: 15/404,126

(22) Filed: Jan. 11, 2017

(65) Prior Publication Data

US 2018/0198733 A1    Jul. 12, 2018

(51) Int. Cl.
*H04L 12/911* (2013.01)
*H04L 12/24* (2006.01)
(Continued)

(52) U.S. Cl.
CPC .......... *H04L 47/745* (2013.01); *G06N 20/00* (2019.01); *H04L 41/147* (2013.01);
(Continued)

(58) Field of Classification Search
CPC . H04L 41/5051; H04L 47/125; H04L 47/127; H04L 67/10; H04L 67/303;
(Continued)

(56) References Cited

U.S. PATENT DOCUMENTS 8,392,578 B1 * 3/2013 Donovan ................ H04L 67/02
709/227
9,509,782 B2    11/2016 Lawson et al.
(Continued)

FOREIGN PATENT DOCUMENTS

CN    102088755 A    6/2011
CN    110168969 A    8/2019
(Continued)

OTHER PUBLICATIONS

"International Search Report" and "Written Opinion of the International Searching Authority," Patent Cooperation Treaty Application No. PCT/US2017/061383, dated Jan. 19, 2018, 8 pages.
(Continued)

*Primary Examiner* — Patrice L Winder
*Assistant Examiner* — Lam H Duong
(74) *Attorney, Agent, or Firm* — Carr & Ferrell LLP

(57) ABSTRACT

A system includes at least one server that is configured to provide a multi-client network service to a plurality of existing users. When the server receives requests to join the multi-client network service from new users, the server may issue timestamps to each new user, obtain load metric based on the requests or timestamps, and collect the load metric to obtain historical data characterizing a demand in the multi-client network service over time. Further, based on the historical data, the server can predict a future load demand in the multi-client network service and selectively enable to join the multi-client network service by at least one of the plurality of new users based on the future load demand.

16 Claims, 4 Drawing Sheets

(51) Int. Cl.
| | |
|---|---|
| *H04L 12/26* | (2006.01) |
| *H04L 29/08* | (2006.01) |
| *G06N 20/00* | (2019.01) |
| *H04L 12/927* | (2013.01) |
| *H04L 12/801* | (2013.01) |

(52) U.S. Cl.
CPC .......... *H04L 43/0876* (2013.01); *H04L 43/16* (2013.01); *H04L 47/803* (2013.01); *H04L 67/306* (2013.01); *H04L 43/0852* (2013.01); *H04L 43/106* (2013.01); *H04L 47/15* (2013.01)

(58) Field of Classification Search
CPC ... H04L 43/0882; H04L 43/16; H04L 43/106; H04L 41/147; H04L 43/0876; H04L 47/745; H04L 43/0852; H04L 67/306; H04L 47/15; H04L 47/0852; H04L 47/803; G06N 20/00
USPC ......................................................... 709/225
See application file for complete search history.

(56) References Cited

U.S. PATENT DOCUMENTS

| | | |
|---|---|---|
| 10,048,830 B2 | 8/2018 | Jose et al. |
| 10,263,859 B2 | 4/2019 | Morgan et al. |
| 10,644,970 B2 | 5/2020 | Vinnakota et al. |
| 2003/0231621 A1 | 12/2003 | Gubbi et al. |
| 2006/0120282 A1 | 6/2006 | Carlson et al. |
| 2009/0125625 A1 | 5/2009 | Shim et al. |
| 2010/0281178 A1 | 11/2010 | Sullivan |
| 2011/0023096 A1 | 1/2011 | Xiao et al. |
| 2011/0055726 A1 | 3/2011 | Hamilton, II et al. |
| 2011/0264778 A1 | 10/2011 | McGregor et al. |
| 2011/0314077 A1 | 12/2011 | Pala et al. |
| 2012/0102132 A1 | 4/2012 | Lee |
| 2013/0044582 A1 | 2/2013 | Ahmed |
| 2013/0335519 A1 | 12/2013 | Greenslade et al. |
| 2014/0153422 A1* | 6/2014 | Nambiar ............... H04L 47/122 370/252 |
| 2015/0161752 A1* | 6/2015 | Barreto .................. G06Q 50/30 705/7.15 |
| 2015/0237383 A1 | 8/2015 | Reidl et al. |
| 2015/0375113 A1* | 12/2015 | Justice .................. A63F 13/355 463/42 |
| 2016/0248861 A1 | 8/2016 | Lawson et al. |
| 2016/0301617 A1* | 10/2016 | Peterson ................. H04L 47/52 |
| 2017/0046146 A1 | 2/2017 | Jamjoom et al. |
| 2017/0160880 A1 | 6/2017 | Jose et al. |
| 2018/0198690 A1 | 7/2018 | Morgan et al. |
| 2018/0234319 A1* | 8/2018 | Suri .................... H04L 43/0882 |
| 2019/0179663 A1 | 6/2019 | Xu |
| 2019/0220305 A1 | 7/2019 | Festa |
| 2020/0021505 A1 | 1/2020 | Vinnakota et al. |

FOREIGN PATENT DOCUMENTS

| | | |
|---|---|---|
| CN | 110168970 A | 8/2019 |
| EP | 2728828 A1 | 5/2014 |
| EP | 3568931 A1 | 11/2019 |
| EP | 3568932 A1 | 11/2019 |
| WO | WO2018132172 A1 | 7/2018 |
| WO | WO2018132173 A1 | 7/2018 |
| WO | WO2020013999 A1 | 1/2020 |

OTHER PUBLICATIONS

"International Search Report" and "Written Opinion of the International Searching Authority," Patent Cooperation Treaty Application No. PCT/US2017/061391, dated Jan. 19, 2018, 8 pages.

Ye, Meng et al., "System-Performance Modeling for Massively Multiplayer Online Role-Playing Games," IBM Systems Journal, vol. 45, No. 1; Jan. 20, 2006, pp. 45-58.

Shaikh, Anees et al., "On Demand Platform for Online Games," IBM Systems Journal, vol. 45, No. 1; Jan. 11, 2006, pp. 7-19.

Djrutland1 et al., "An Evolution of a Self Confessed Video Games Snob," djrutlandl [online], Mar. 17, 2013 [retrieved on Jul. 10, 2018], Retrieved from the Internet: <URL:https://djrutland1.wordpress.com/page/22>, 21 pages.

"International Search Report" and "Written Opinion of the International Searching Authority," Patent Cooperation Treaty Application No. PCT/US2019/039594, dated Oct. 2, 2019, 9 pages.

Atkisson, Brian, "The Truth About Microservices," DZone, May 5, 2017 [retrieved on Sep. 1, 2019], Retrieved from the Internet: <URL:https://www.dzone.com/articles/the-truth-about-microservices>, 34 pages.

Swersky, Dave, "The Hows, Whys and Whats of Monitoring Microservices," The New Stack, Jun. 21, 2018 [retrieved on Sep. 1, 2019], Retrieved from the Internet: <URL:https://thenewstack.io/the-hows-whys-and-whats-of-monitoring-microservices/>, 15 pages.

Viennot, Nicolas et al., "Synapse: A Microservices Architecture for Heterogeneous-Database Web Applications," Proceedings of the Tenth European Conference on Computer Systems, Apr. 21, 2015 [retrieved on Sep. 1, 2019], Retrieved from the Internet: <URL:https://roxanageambasu.github.io/publications/eurosys2015synapse.pdf>, 16 pages.

"Extended European Search Report" and "Written Opinion", European Patent Application No. 17891987.4, dated Jul. 23, 2020, 7 pages.

"Office Action", Japanese Patent Application No. 2019-536199, dated Jul. 21, 2020, 8 pages.

"Extended European Search Report" and "Written Opinion", European Patent Application No. 17891986.6, dated Jul. 23, 2020, 9 pages.

Ashraf, Adnan et al., "Stream-Based Admission Control and Scheduling for Video Transcoding in Cloud Computing", Cluster, Cloud and Grid Computing (CCGRID), 2013 13th IEEE/ACM International Symposium, May 13, 2019, pp. 482-489.

\* cited by examiner

PREDICTING WAIT TIME FOR NEW SESSION INITIATION DURING INCREASED DATA TRAFFIC LATENCY

BACKGROUND

Technical Field

This disclosure generally relates to multi-client network services such as multiplayer online games or video-on-demand services. More particularly, this disclosure relates to a system and method for providing a multi-client network service where a new user session can be delayed in response to detection of increased data traffic latency. The system and method of this disclosure can be applicable, for example, in online game environments, digital content distribution environments, and also non-entertainment environments.

Description of Related Art

In recent years, multi-client network services, such as multiplayer online games, online entertainment services, and video-on-demand services, have become common and popular. Traditionally, the multi-client network services are implemented on one or more servers, which serve a plurality of remotely located users. One of existing technical problems with the multi-client network services involves their poor performance when an immediate scaling is required. For example, when a count of new users attempting to access the same multi-client network service, which is already provided to a certain amount of existing users, rapidly increases, the server handling the multi-client network service may not respond quickly to join the new users to the multi-client network service. These events typically cause degrading service speeds, making the experience and enjoyment of the multi-client network service poor for all users, including the new users and existing users.

One particular example of this problem is known as a "game rush," which may happen when a particular multiplayer online game becomes of interest to a large group of new players, who attempt to participate in the game at substantially same time instances. Accordingly, with the increase of joining requests by the new users, a data load stress on the servers and network infrastructure handling the multiplayer online game also increases. Upon increase of the stress over a certain threshold, the new and existing users start experiencing greater latency, slower speeds, or overall degraded experience. This may cause the new and existing users to re-launch or re-connect to the multiplayer online game, which incrementally increases data traffic on the servers and infrastructure, thereby causing even greater stress on the servers and additional slowing down of the service. Accordingly, there is still a need to improve and stabilize the performance of multi-client network services upon a steep increase of new users attempting to access or join the same multi-client network service.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In one aspect of this disclosure, there is provided a system for providing a multi-client network service of entertainment or non-entertainment nature. The system comprises a server including at least one processor, a non-transitory computer-readable medium including computer-executable program instructions, and a network interface configured to operatively connect the server with a plurality of remote user devices. The system can also include at least one data storage configured to store at least digital media content. When the computer-executable program instructions are executed by the at least one processor, the at least one processor provides the multi-client network service to a plurality of existing users over at least one data network, receives a plurality of requests to join the multi-client network service from a plurality of new users such that the new users can access the multi-client network service similarly to how the existing users access the multi-client network service, and obtains load metric from the plurality of requests to join the multi-client network service, wherein the load metric characterize at least a traffic load on the multi-client network service. Further, the at least one processor collects the load metric to obtain historical data characterizing, for example, a demand in the multi-client network service over time, predicts a future load demand in the multi-client network service based on the historical data, and selectively enables to join the multi-client network service by at least one of the plurality of new users based on the future load demand.

In another aspect of this disclosure, there is provided a method for providing a multi-client network service. The method may be implemented by a computer or a server and comprise the following operations: providing the multi-client network service to a plurality of existing users over at least one data network, receiving a plurality of requests to join the multi-client network service from a plurality of new users such that the new users can access the multi-client network service similarly to how the existing users access the multi-client network service, and obtaining load metric from the plurality of requests to join the multi-client network service, wherein the load metric characterize at least a traffic load on the multi-client network service. The method further comprises collecting the load metric to obtain historical data characterizing a demand in the multi-client network service over time, predicting a future load demand in the multi-client network service based on the historical data, and selectively enabling to join the multi-client network service by at least one of the plurality of new users based on the future load demand.

In yet another aspect of the disclosure, there is provided a non-transitory processor-readable medium having instructions stored thereon, which when executed by one or more processors, cause the one or more processors to implement the above-outlined method for providing a multi-client network service.

Additional objects, advantages, and novel features of the examples will be set forth in part in the description, which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

Figure 1:
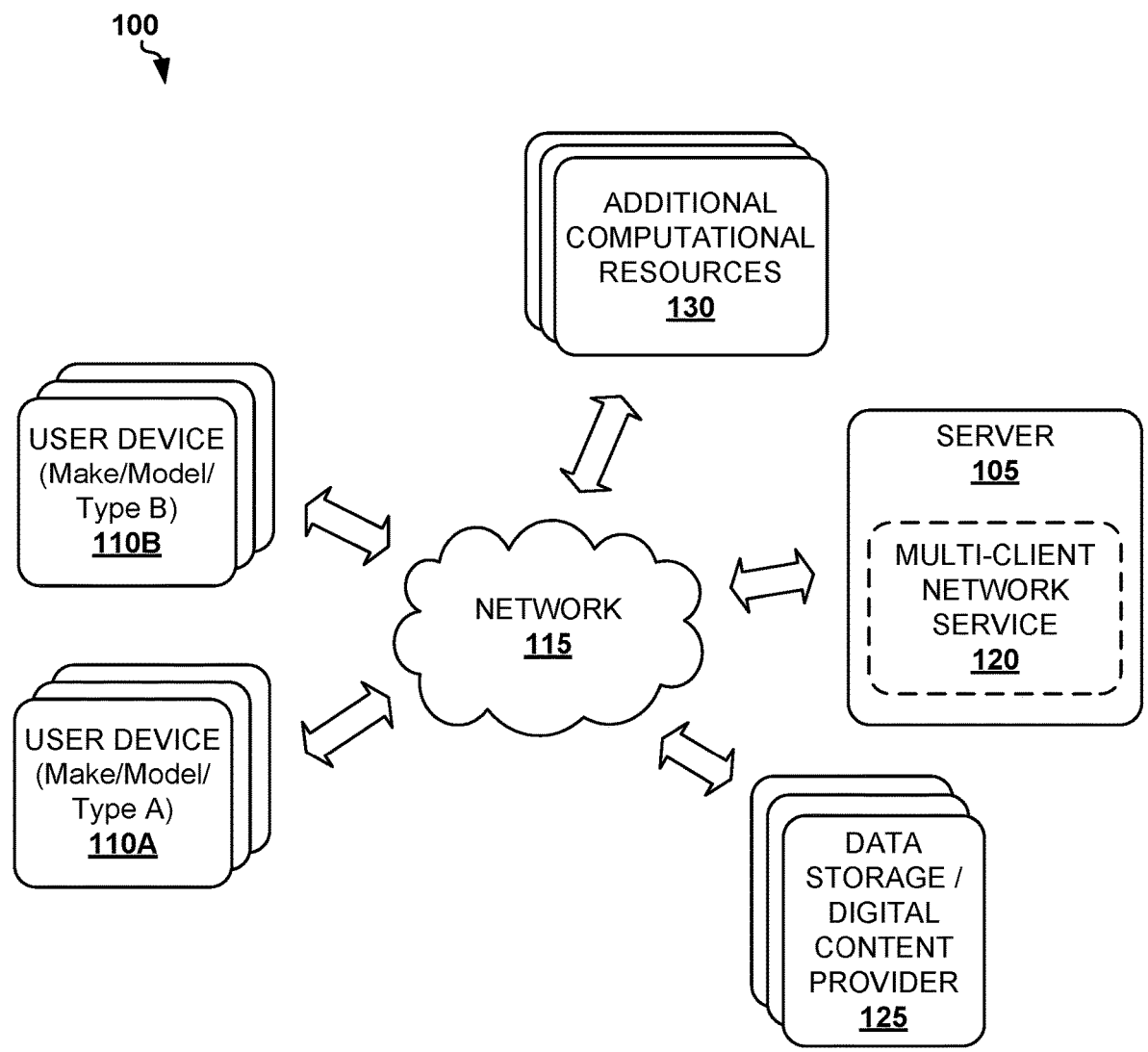
FIG. 1 shows a block diagram illustrating a system for providing a multi-client network service.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION OF EXAMPLE EMBODIMENTS

The present disclosure generally relates to a system and methods for providing a multi-client network service such as a multiplayer online game, a video-on-demand service, or similar online or network-based entertainment service available to a plurality of remotely located users. The principles of this disclosure are also applicable to non-entertainment systems. The aspects of embodiments disclosed herein overcome at least some prior art drawbacks and/or solve a technological problem of degrading performance of a multi-client network service upon a steep increase in count of new-to-session users seeking to join the multi-client network service (such as during a "game rush" event). Accordingly, at least some aspects of embodiments disclosed herein can provide certain technical effects such as improving stability and performance of the system for providing a multi-client network service upon an increase in demand in the same multi-client network service such that the existing users to the multi-client network service do not experience a significant latency or degradation in enjoyment of the multi-client network service. The principles of this disclosure can be utilized in both systems that can dynamically grow their capacity (e.g., scalable systems) and systems having static capacity.

According to various embodiments of this disclosure, the system issues timestamps (or other indicia) to all clients (users) when the system receives requests to initiate, access, or join a particular multi-client network service from the clients (users). When clients (users) are able to initiate, access, or join the multi-client network service, the clients become "existing users." Furthermore, when the system receives, from a new user, a request to join the multi-client network service and this multi-client network service is already joined by a number of existing users, the system can issue a timestamp or other indicia to the request or the new user or a user device of the new user. Timestamps associated with a plurality of new users can be monitored and processed by the system so as to determine a level of "stress" on the system, latency, traffic volume, and/or any other similar load metric. This load metric can be monitored in real-time to determine if it becomes above a certain predetermined or dynamically determined threshold value. If the load metric becomes above the threshold value, the system may not allow the new users to join the multi-client network service so as not to degrade the experience and enjoyment of the multi-client network service by the existing users. The new users may be asked to wait a certain period until the current load capacity of the system is enlarged or the system is properly scaled to be able to join the new users with no effect on the existing users. Accordingly, the new users can be joined to the multi-client network service on a first-come-first-served policy basis, for example, based on the corresponding timestamps or other indicia or identifiers (IDs) assigned to the new user.

In another embodiment, the system has another load threshold such that requests are not issued a timestamp when the load is below the load threshold. In such an embodiment, the overhead of issuing timestamps is avoided if there is little load on the system. As the load increases, the new threshold will be surpassed, and requests from the users will receive timestamps. As the load increases further, the load threshold is surpassed, but requests from the previous users will have timestamps, be recognized as "existing users," and not be made to wait.

In certain implementations, the system may also determine a make, model, type, or any other characteristic of personal user device or machine of the new users such that the system can prioritize joining only those users who operate the personal user devices or machines of a predetermined make, model, type, or other characteristic. For example, those new users that operate game devices of a particular brand may be allowed to join the multi-client network service before other new users that operate other devices can join the same multi-client network service.

In another implementation, a determination regarding treatment of an incoming request could be based on the user rather than the device the request came from. For example, a user with a "gold level" account may be given a priority regardless of what device is being used. The account level can be determined by the system based on data contained in the user request.

In another implementation, when an estimated wait time is provided in the response to a user request, the user device can display the estimated wait time to a user.

In another implementation, when the estimated wait time is calculated, the response to the request can provide information regarding controlling the period of time until the user (client) retries the user request. This delay can increase as the load on the system increases, reducing the number of retry requests that are coming into the system, which reduces the stress on the system when that relief is most needed.

In yet another implementation, the server can keep track of particular timestamps issued, such as with an ID, so that it may invalidate a timestamp if the client presenting the timestamp misbehaves, such as retrying requests too frequently.

In additional implementations, the issued timestamps may have an expiration time. If a particular existing user returns with the timestamp after a long absence, then their timestamp will be expired and he will be treated as a "new user" instead of as an "existing user" and will be issued a new timestamp and may be caused to wait before joining the same multi-client network service. The expiration of a timestamp may be extended as a user makes additional requests with the timestamp. This may be done by returning an updated timestamp to the user, or by adjusting an expiration stored on the server side. There can be a limit to how far a timestamp expiration can be extended.

In some additional implementations, the timestamp provided to the user (client or user device) can be secured by applying encryption, hashing, salting, checksums, or associating the timestamp with the user (e.g., an Internet Protocol (IP) address, device ID, account ID, and the like).

In yet additional implementations, the system can be configured to aggregate the load metric over time to generate historical data. The historical data can be analyzed by the system to make load or traffic predictions. The predictions can change the threshold value so as to address a possible steep increase in the new users in advance. In other words, the predictions can be used in determining whether to join new users to the multi-client network service at given times. Thus, the system enables early detection of certain events, such as a "game rush" event, and addresses these events in advance. The predictions can be made based on the historical data using artificial intelligence methods, machine-learning methods, statistical methods, heuristic methods, data pattern recognition methods, curve comparison methods, and/or methods for determining acceleration or deceleration in a load demand or another characteristic associated with the use of the multi-client network service.

In certain additional implementations, there can be more than one threshold value established to watch. For example, there can be a first threshold value corresponding to a predetermined amount of load on the system. When the load metric (e.g., as explained herein, a level of "stress" on the system, latency, traffic volume, or other metric based on the timestamps) becomes above the first threshold value, the system may not allow the new users to join the multi-client network service so as not to degrade the experience and enjoyment of the multi-client network service by the existing users. The new users may be asked to wait a certain period until the current load capacity of the system is enlarged or the system is properly scaled to be able to join the new users seamlessly for the existing users. The first threshold value can be set based on the capacity of the system. The first threshold value can be fixed or automatically updated in real-time based on one or more criteria. The system can also maintain a second threshold value, which differs from the first threshold value. The second threshold value typically comes into play when the first threshold value was "triggered" (i.e., when the load metric reached the first threshold value). The second threshold value can be a cut-off time for the timestamps. Accordingly, the users that caused generation of user requests with the timestamps issued before the second threshold value (i.e., the cut-off time) are allowed to join the multi-client network service. In contrast, the users that caused generation of user requests with the timestamps issued after the second threshold value (i.e., the cut-off time) are not allowed to join the multi-client network service for at least a wait period. The second threshold value can be predetermined or be constantly updated based on the load on the system.

In some implementations, the multi-client network service or the system can keep track of the timestamps that it issues. For example, the system can use this information in determining how far to move the second threshold value when adjusting the second threshold value.

It should be mentioned that that the multi-client network service can be utilized in both entertainment services (e.g., content delivery systems, online games, etc.) and non-entertainment services (e.g., an online stock quote and trade systems). The embodiments of this disclosure are applicable to both entertainment services and non-entertainment services. However, to provide examples, the disclosure refers mostly to online gaming.

In certain embodiments, the system for providing a multi-client network service described herein, can be of a fixed capacity. In these embodiments, the system is designed to force new users to wait in order to ensure that the system capacity is not exceeded and the existing users are allowed to use the system normally. Accordingly, the principles described herein can be useful in situations where the system experiences a spike in data traffic caused by new users. An attempt to provide service to all of the new and existing users would result in the system exceeding its capacity. Such a spike can be caused, for example, by the traffic created by timers.

In other implementations, the system for providing a multi-client network service described herein, can possess the ability to dynamically increase the system capacity in response to an increased load (traffic). This can be accomplished, for example, by allowing additional servers to handle system requests. It may take some time for the new capacity to become available once the system initiates the increase in capacity. A sudden spike in traffic may cause the number of requests to the system to exceed the capacity of the system to handle those requests between the time the system initiates the increase in capacity and the time the increase in capacity becomes available. New user requests can be forced to wait when the traffic exceeds the capacity in order to ensure that existing users are not adversely affected. When the additional capacity becomes available, the new session requests forced to wait can be allowed to get the access to the multi-client network service. If the increase in traffic is more substantial than the increase in capacity, then only some of the new users that were forced to wait can be allowed to access the multi-client network service in order to ensure that the new set of existing users does not exceed the new capacity.

The following detailed description of embodiments includes references to the accompanying drawings, which form a part of the detailed description. Approaches described in this section are not prior art to the claims and are not admitted to be prior art by inclusion in this section. Reference throughout this specification to "one embodiment," "an embodiment," "some embodiments," "some implementations" or similar language means that a particular feature, structure, or characteristic described in connection with an example implementation is included in at least one embodiment of the present disclosure. Thus, appearances of the phrases "in one embodiment," "in an embodiment," "in some embodiments," and similar language throughout this specification may, but do not necessarily, all refer to the same embodiment.

Furthermore, the described features, structures, or characteristics of embodiments may be combined in any suitable manner in one or more implementations. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Aspects of the embodiments of this disclosure will now be presented with reference to accompanying drawings which show blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean processor-executable instructions, instruction sets, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more embodiments, the functions described herein may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

The terms "digital content" and "digital product" shall be construed to mean one or more of the following: media content, multimedia content, entertainment content, video, video-on-demand, pay-per-view video, audio, music, television show, television program, movie, computer game, video game, Internet game, network game, console game, virtual reality content, electronic book, and electronic magazine. According to embodiments of this disclosure, digital products can be for purchase-only products. The terms "digital content" and "digital product" can be used interchangeably.

The term "multi-client network service" shall be construed to mean a provision of a requested service using client-server architecture to communicate data relating to the requested service to a plurality of end users. Some examples of multi-client network service include a multiplayer online game, multiplayer network game, multiplayer Internet-based game, multiplayer virtual reality game, Internet-based media content broadcasting, online multimedia content broadcasting, online entertainment content broadcasting, video-on-demand service, pay-per-view video service, web service, and the like. The multi-client network service can be initiated or called by end users and/or by automated processes, i.e., by computer machines such as end user devices, network devices, servers, and the like. Accordingly, multi-client network service can be initiated or called by a "client," which can be a user or a machine.

The terms "user device," "remote user device," and "personal device" shall mean any electronic device configured to process and display digital data along with data communication. By way of example, and not limitation, some examples of user devices include a mobile device, cellular phone, user equipment, terminal, mobile phone, smart phone, Internet phone, tablet computer, laptop computer, desktop computer, workstation, thin client, personal digital assistant, music player, multimedia player, gaming device, game console, navigation system, television system, multimedia system, multimedia player, netbook, home gateway, broadband gateway, network appliance, set top box, access gateway, networking switch, entertainment system, infotainment system, and in-vehicle computer. The terms "user device," "remote user device," and "personal device" can be used interchangeably.

The term "user" shall be construed to mean an end user of a user device, which is defined above. The term "existing user" shall be construed to mean a user of a user device that already received access or joined to a multi-client network service. The term "new user" shall be construed to mean a user of a user device, which has requested access or joining to a multi-client network service, but which has not yet been provided access or joined to the multi-client network service. The term "new user" can be also construed to mean a "new-to-session" user (i.e., a user who is new to a particular session of a multi-client network service).

The term "load metric" shall be construed to mean a parameter characterizing, for example, a load (e.g., a traffic load) on a system or server providing at least one multi-client network service. The term "load metric" may also be construed to mean a parameter characterizing a utilization of a system or server providing at least one multi-client network service. The term "load metric" may be also construed to mean a parameter characterizing a data traffic latency associated with a system or server providing at least one multi-client network service.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows a block diagram illustrating a system 100 for providing a multi-client network service, according to one example embodiment. FIG. 1 assumes that all callers to the multi-client network service are user devices. The multi-client network service may operate with digital products or data, or can simply validate or generate tokens or make calculations. System 100 can include a server 105, which in turn can include at least one processor, computer-readable medium for storing a database, at least one digital product, or computer-implementable instructions, and a network interface for enabling the server to communicate with other elements of the system. Server 105 may maintain and provide an online store such as online digital content store or online game store for selling digital products to users. Server 105 may maintain and provide a video-on-demand service to a plurality of users. Server 105 may also relate to a game server to maintain and provide a multiplayer online game to a plurality of users.

Server 105 can be in operative communication with one or more user devices 110A, 110B via one or more communications networks 115. As explained above, user devices 110A, 110B are operated by users and can refer to a personal computer, game console, mobile device, and the like device. Communications networks 115 can refer to any wired, wireless, or optical networks including, for example, the Internet, intranet, local area network (LAN), Personal Area Network (PAN), Wide Area Network (WAN), Virtual Private Network (VPN), cellular phone networks (e.g., packet switching communications network, circuit switching communications network), Bluetooth radio, Ethernet network, an IEEE 802.11-based radio frequency network, IP communications network, or any other data communication network utilizing physical layers, link layer capability, or network layer to carry data packets, or any combinations of the above-listed data networks.

User devices 110A, 110B can be of different makes, models, or types. For example, there can be user devices 110A, which refer to user devices of a predetermined make, model, or type, and there can be user devices 110B, which do not refer to the user device of the predetermined make, model, or type. Alternatively, user devices 110A refer to user devices of a first predetermined make, model, or type, while user devices 110B refer to user devices of a second predetermined make, model, or type. For example, user devices 110A can be PlayStation™ devices or Sony™ made devices.

In some implementations, server 105 can be configured to determine a make, model, or type of a user device and categorize it as a user device 110A or as a user device 110B. This determination can be made by the server based on metadata received from the user device or other communications, such as requests to join a multi-client network service, also received from the user device. Further, server 105 can make a decision to add a particular user device based on whether it was categorized as a user device 110A or a user device 110B. For example, server 105 can prioritize joining and serving user devices 110A over user devices 110B.

System 100 also includes one or more data storages or digital content providers 125 such as server computers, which can store digital products or provision at least some part of multi-client network services. The digital products can be transmitted or broadcasted to selected user devices based on instructions received from server 105. For example, when a user of one of user devices 110A or user devices 110B accesses the online store maintained by server 105 and request access to a certain digital product (e.g., a video-on demand or online multiplayer computer game), it can be downloaded from one of data storages or digital content providers 125 to the respective user device; or the user device can be granted access to data storages or digital content provider 125 to access the digital product.

Server 105 can also include a database for maintaining user accounts, user settings, user preferences, user personal information, user payment information, and, optionally, some digital products. The database can be a relational database storing IDs or references of digital products associated with user IDs or user accounts.

As explained herein, server 105 can provide a multi-client network service 120, such as a multiplayer online game, to a plurality of users of user devices 110A and/or user devices 110B. Multi-client network service 120 can be provisioned to the user device over one or more communications networks 115. Server 105 can constantly monitor a data traffic associated with multi-client network service 120 so as to ensure there is no latency in provisioning multi-client network service 120 nor degradation in any performance associated with multi-client network service 120. For these ends, server 105 can issue timestamps to each new user of the user devices 110A, 110E upon receipt by server 105 of requests to access or join multi-client network service 120 by the users. In other implementations, server 105 can issue other indicia or IDs to the new users instead of or in addition to the timestamps.

Based solely on the timestamps, server 105 can make a determination or calculation of a load metric such as a latency value, data traffic value, a system stress value, and the like. In other implementations, however, the load metric can be determined, obtained, or calculated based on other or additional criteria such as data network related measurements, current load capacity and the like.

Server 105 can further maintain a threshold load value, which can be predetermined or dynamically changed based on certain criteria (e.g., a current load capacity of server 105 to provision multi-client network service). Server 105 can repeatedly compare the load metric obtained from the user requests or timestamps with the threshold load value to determine if the load metric meets or exceeds the threshold load value. For example, when there is a "game rush" event or a steep increase in new users, server 105 can detect that the current load metric meets or exceeds the threshold load value. In this case, the new users are not allowed to access or join multi-client network service 120, at least on a temporary basis, and are kept in a wait mode, so as to ensure that the existing users continue enjoying multi-client network service 120 without interruptions nor degradation in a quality of service associated with multi-client network service 120.

In some implementations, the wait mode can be ended and the new users can join multi-client network service 120 after expiration of a predetermined period. In other implementations, the wait mode can be ended and the new users can join multi-client network service 120 after server 105 determines that the current load metric becomes below the threshold load value. In other implementations, the wait mode can be ended and the new users can join multi-client network service 120 after server 105 scales up so as to be able to provision the same multi-client network service 120 to a larger group of users without a substantial decrease in speeds or an increase in latency. For example, server 105 can manage adding or activating one or more additional computational resources 130 (e.g., servers similar to server 105) to act in concert with server 105 in provisioning the same multi-client network service 120 to a larger group of users. When additional computational resources 130 are added or activated, one or more of the new users can be enabled to join the multi-client network service 120.

So long as the new users are not allowed to access or join multi-client network service 120 when server 105 detects that the current load metric meets or exceeds the threshold load value, server 105 can deliver or cause delivering to these new users a wait message to inform them that they are not allowed to access or join multi-client network service 120 at least on a temporary basis. Server 105 can also calculate a wait time for each individual new user based at least on its timestamp and optionally other criteria such as the current load capacity, the current load metric, or the current threshold load value. The wait time can be included in the wait message. Thus, the new users may understand when they can start enjoying the multi-client network service 120.

Server 105 can be also configured to determine and monitor a current load capacity of server 105 or multi-client network service 120 based on one or more criteria such as a count of new and existing users, timestamps, bandwidth, network infrastructure parameters, latency parameters, and so forth. In some implementations, server 105 can also be configured to dynamically or repeatedly update the threshold load value based on changes in the current load capacity over time.

Server 105 is also configured to answer one or more discrete network requests generated by new users and existing users. Server 105 may not maintain an established connection for existing users but can answer additional requests generated by the existing users. Server 105 can analyze the requests and differentiate if they are originated by the existing users or new users. For example, as server 105 answers each of these additional requests, server 105 will tell from the timestamps that a particular request is from an existing user and will allow that request through even if other requests are being told to wait.

In yet additional implementations, server 105 can be also configured to collect the load metric over one or more periods to obtain historical data. Thus, the historical data characterizes a demand in multi-client network service 120 over a predetermined period. In other words, the historical data can inform how the load metric changes over time with respect to a certain multi-client network service based on a number of factors or events.

Further, server 105 can process and analyze the historical data to make certain predictions related to a future load demand in multi-client network service 120, a load capacity associated with server 105 or multi-client network service 120, or a load metric. Server 105 can selectively enable one or more new users to access or join multi-client network service 120 based at least in part on these predictions. The predictions can be made based on the historical data using artificial intelligence methods, machine-learning methods, statistical methods, heuristic methods, data pattern recognition methods, curve comparison methods, and/or methods for determining acceleration or deceleration in the load demand or another characteristic associated with multi-client network service 120.

Figure 2:
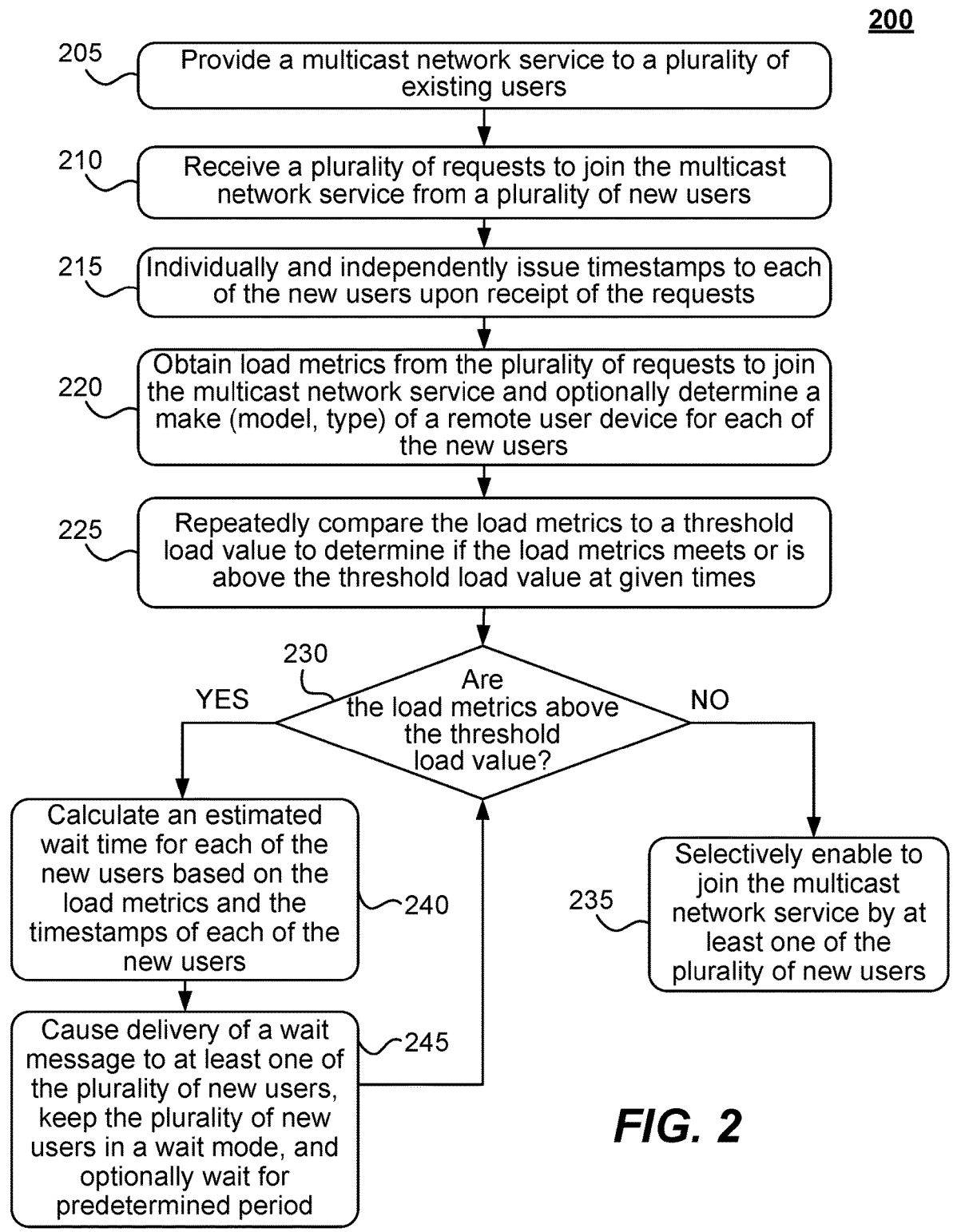
FIG. 2 shows a process flow diagram of a method for providing a multi-client network service.

FIG. 2 is a process flow diagram showing a method 200 for providing a multi-client network service, according to an example embodiment. Method 200 may be performed by processing logic that may comprise hardware (e.g., decision-making logic, dedicated logic, programmable logic, application-specific integrated circuit (ASIC)), software (such as software run on a general-purpose computer system or a dedicated machine), or a combination of both. In one example embodiment, the processing logic refers to server 105 of FIG. 1. Below recited operations of method 200 may be implemented in an order different than described and shown in the figure. Moreover, method 200 may have additional operations not shown herein, but which can be evident for those skilled in the art from the present disclosure. Method 200 may also have fewer operations than outlined below and shown in FIG. 2.

Method 200 assumes that a multi-client network service is already initiated by one or more clients (user devices) and the users that use the multi-client network service are "existing clients." Accordingly, method 200 can commence in operation 205 with server 105 providing or maintaining multi-client network service 120 to a plurality of existing users of user devices 110A, 110B over at least one communications network 115. Multi-client network service 120 can refer to, for example, a network multiplayer game, an online multiplayer game, a virtual reality multiplayer game, a video-on-demand service, a television broadcasting service, a multiuser online entertainment service, and the like.

At operation 210, server 105 receives one or more requests to join multi-client network service 120 from one or more new users such that the new users can access the same multi-client network service 120 similarly to how the existing users access and enjoy the multi-client network service 120. The requests to join multi-client network service 120 can include certain data or metadata such as a user ID, user credentials, information pointing out what multi-client network service the user want to join or access, information concerning a make, model, or type of user device, and so forth. In some embodiments, server 105 can request from user devices of the new users any or all of the above-listed parameters such as a user ID, user credentials, information pointing out what multi-client network service the user want to join or access, and information concerning a make, model, or type of user device.

At operation 215, server 105 individually and independently issues timestamps to each of the new users upon receipt of the requests to access or join multi-client network service 120 from the new users. The timestamps can be associated with the requests to access or join multi-client network service 120 and stored in a memory or database of server 105 or other data storage such as data storage 125. Each of the timestamps can characterize a time and date when a certain new user requested to access or join multi-client network service 120 or when a corresponding request to access or join multi-client network service 120 was received by server 105.

At operation 220, server 105 obtains load metric from the requests to join or access multi-client network service 120. The load metric can be calculated based on the timestamps and optionally other parameters such as a current load capacity of multi-client network service 120. For these ends, server 105 may repeatedly determine the current load capacity of multi-client network service 120. Thus, the load metric can characterize at least a traffic load on the multi-client network service at one or more given times.

At operation 225, server 105 repeatedly compares the load metric to a threshold load value to determine if the load metric meets or is above the threshold load value at given times. Accordingly, at operation 230, server 105 makes a corresponding decision as to whether the load metric meets or is above the threshold load value at given times. Obviously, operations 225 and 230 can be considered as a single operation performed by server 105.

If it is determined that the load metric does not meet or is below the threshold load value, method 200 proceeds to operation 235 where server 105 selectively enables one or more of the new users to join or access multi-client network service 120. In some implementations, the new users can be enabled or allowed to join multi-client network service 120 on a first-come-first-served policy basis. In other implementations, and as explained above, the new users can be enabled or allowed to join multi-client network service 120 based on the make, model, brand, or type of the user device 110A or 110B that the new users use.

Alternatively, if it is determined that the load metric does meet or is above the threshold load value, method 200 proceeds to operation 240, where server 105 calculates an estimated wait time for each of the new users based on the load metric and the timestamps of each of the new users. Further, at operation 245, server 105 causes delivery of a wait message to at least one of the new users and keeps at least one of the new users in a wait mode for a predetermined period or until the load metric changes so as not to meet or be above the threshold load value. The load metric can change if the existing users "leave" and no longer access multi-client network service 120 or when server 105 activates one or more additional computational (or network) resources 130 to increase a capacity of server 105 or multi-client network service 120. Each of the wait messages can include the estimated wait time individually calculated for each of the new users. After expiration of a predetermined period, method 200 may return back to operation 225 and operation 230 to determine whether the load metric changed so as to meet or be above the threshold load value. Accordingly, if existing users leave and no longer access multi-client network service 120 or server 105 activates one or more additional computational (or network) resources 130, server 105 can enable joining the multi-client network service 120 by one or more of the new users.

In some implementations, the threshold load value can be dynamically updated by server 105 based on changes in the current load capacity of the multi-client network service or other parameters such as data traffic parameters.

As explained above, server 105 can maintain a second threshold value, which differs from the above threshold value. The second threshold value may come into play at operations 240 or 245. The second threshold value can be a cut-off time for the timestamps. Accordingly, the users that caused generation of user requests with the timestamps issued before the second threshold value (i.e., the cut-off time) are allowed to join the multi-client network service. In contrast, the users that caused generation of user requests with the timestamps issued after the second threshold value (i.e., the cut-off time) are not allowed to join the multi-client network service for at least a wait period. The second threshold value can be predetermined or be constantly updated based on the load on the system.

Figure 3:
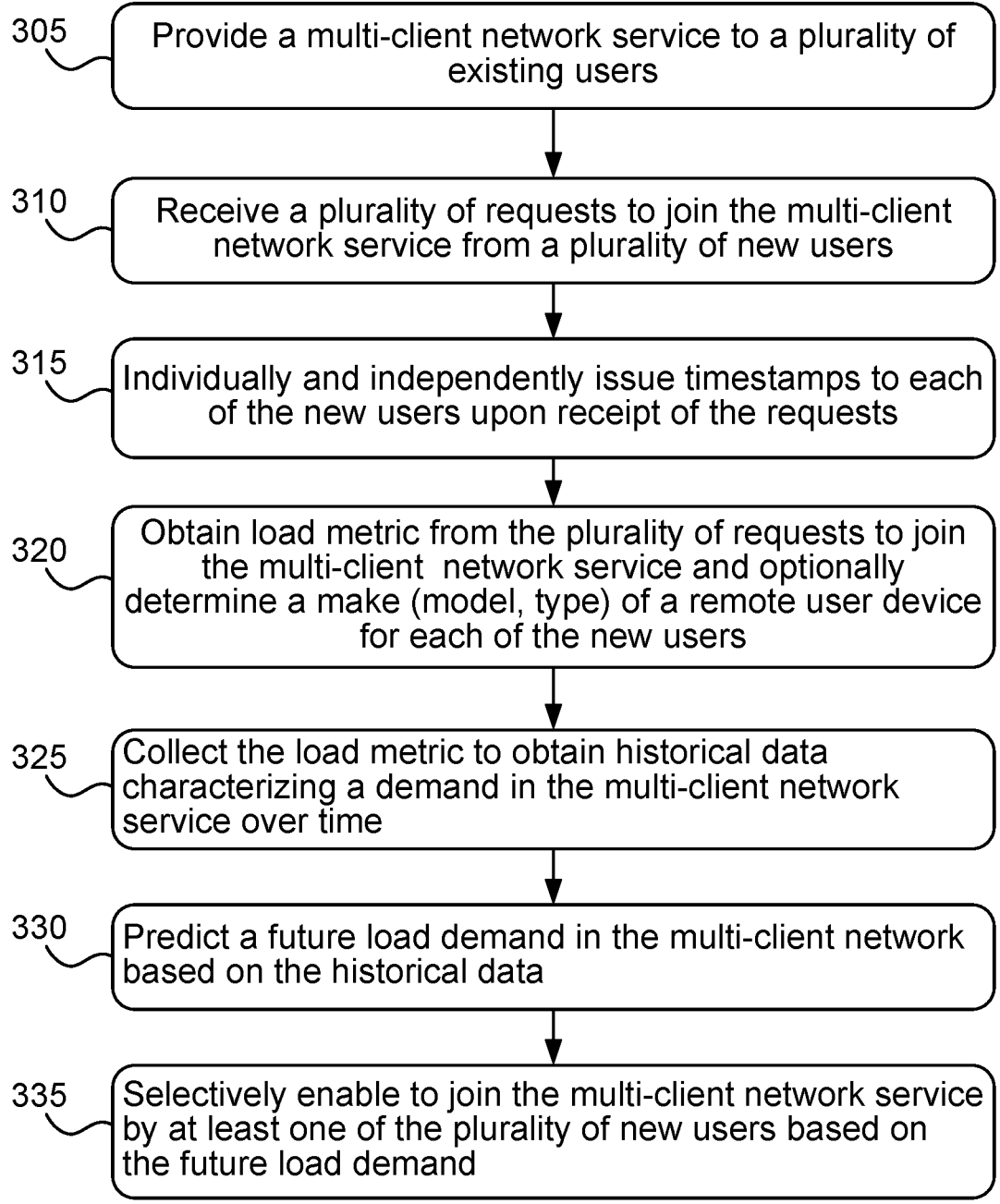
FIG. 3 shows a process flow diagram of another method for providing a multi-client network service.

FIG. 3 is a process flow diagram showing another method 300 for providing a multi-client network service, according to an example embodiment. Method 300 may be performed by processing logic that may comprise hardware (e.g., decision-making logic, dedicated logic, programmable logic, ASIC), software (such as software run on a general-purpose computer system or a dedicated machine), or a combination of both. In one example embodiment, the processing logic refers to server 105 of FIG. 1. Below recited operations of method 300 may be implemented in an order different than described and shown in the figure. Moreover, method 300 may have additional operations not shown herein, but which can be evident for those skilled in the art from the present disclosure. Method 300 may also have fewer operations than outlined below and shown in FIG. 3. In some implementations, operations of method 200 and operations of method 300 can be mixed together in a hybrid method.

Method 300 commences at operation 305 when server 105 provides, provisions, or maintains multi-client network service 120 to a plurality of existing users of user devices 110A, 110E over at least one communications network 115. As explained above, multi-client network service 120 can refer to, for example, a network multiplayer game, an online multiplayer game, a virtual reality multiplayer game, a video-on-demand service, a television broadcasting service, a multiuser online entertainment service, and the like.

At operation 310, server 105 receives one or more requests to join multi-client network service 120 from one or more new users such that the new users can access the same multi-client network service 120 similarly to how the existing users access and enjoy the multi-client network service 120. The requests to join multi-client network service 120 can include certain data or metadata such as a user ID, user credentials, information pointing out what multi-client network service 120 the user want to join or access, information concerning a make, model, or type of user device, and so forth. In some embodiments, server 105 can request from user devices of the new users any or all of the above-listed parameters such as a user ID, user credentials, information pointing out what multi-client network service the user want to join or access, and information concerning a make, model, or type of user device.

At operation 315, server 105 individually and independently issues timestamps to each of the new users upon receipt of the requests to access or join multi-client network service 120 from the new users. The timestamps can be associated with the requests to access or join multi-client network service 120 and stored in a memory or database of server 105 or other data storage such as data storage 125. Each of the timestamps can characterize a time and date when a certain new user requested to access or join multi-client network service 120 or when a corresponding request to access or join multi-client network service 120 was received by server 105. In some implementations, the timestamps can be replaced with other IDs or indicia to reflect timing of when a corresponding request was issued, sent, or received by server 105.

At operation 320, server 105 obtains load metric from the requests to join or access multi-client network service 120. The load metric can be calculated based on the timestamps and optionally other parameters, such as a current load capacity of multi-client network service 120. For these ends, server 105 may repeatedly determine the current load capacity of multi-client network service 120. Thus, the load metric can characterize at least a traffic load on the multi-client network 120 service at one or more given times.

At operation 325, server 105 collects the load metric to obtain historical data characterizing, for example, a demand in multi-client network service 120 over time. In other words, the historical data can inform how the load metric changes over time with respect to multi-client network service 102 based on a number of factors or events (such as a "game rush" event).

At operation 330, server 105 predicts a future load demand with respect to multi-client network service 120 based on the historical data. The predictions can be made by server 105 based on the historical data using one or more of the following: an artificial intelligence method, machine-learning method, statistical method, heuristic method, data pattern recognition method, curve comparison method, and method for determining acceleration or deceleration in the load demand or another characteristic associated with multi-client network service 120.

At operation 335, server 105 selectively enables to join or access multi-client network service 120 by at least one of the new users based on the future load demand earlier predicted by server 105. Operation 335 can be a supplemental one to operations 225 and 230 performed in method 200 of FIG. 2. In other words, in some optional implementations, the predictions can contribute in deciding or calculating the threshold load value.

Figure 4:
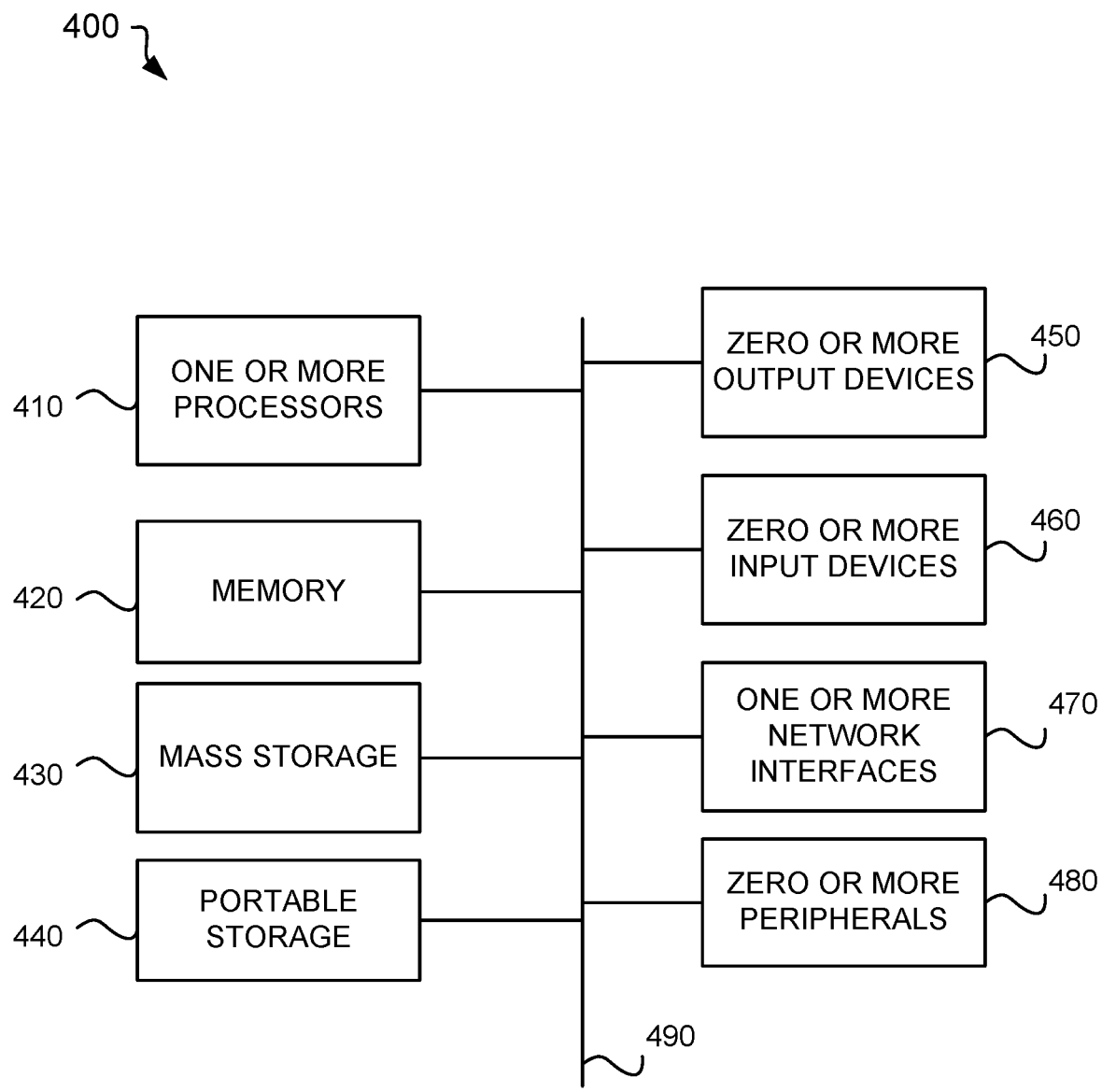
FIG. 4 shows an example computer system that can be used to implement the methods for providing a multi-client network service.

FIG. 4 is a high-level block diagram illustrating a computing device 400 suitable for implementing the methods described herein. In particular, computing device 400 may be used for implementing the methods for providing the multi-client network service 120 as described above. Computing device 400 may include, be, or be an integral part of one or more of a variety of types of devices, such as a general-purpose computer, desktop computer, laptop computer, tablet computer, server, netbook, mobile phone, smartphone, infotainment system, smart television device, among others. In some embodiments, computing device 400 can be regarded as an instance of server 105, user device 110A, user device 110B, additional computational resources 130, and data storages or digital content providers 125.

As shown in FIG. 4, computing device 400 includes one or more processors 410, memory 420, one or more mass storage devices 430, zero or more output devices 450, zero or more input devices 460, one or more network interfaces 470, zero or more optional peripheral devices 480, and a communication bus 490 for operatively interconnecting the above-listed elements. Processors 410 can be configured to implement functionality and/or process instructions for execution within computing device 400. For example, processors 410 may process instructions stored in memory 420 or instructions stored on storage devices 430. Such instructions may include components of an operating system or software applications.

Memory 420, according to one example, is configured to store information within computing device 400 during operation. For example, memory 420 can store a database or digital media content such as digital products or other data pertaining to multi-client network services. Memory 420, in some example embodiments, may refer to a non-transitory computer-readable storage medium or a computer-readable storage device. In some examples, memory 420 is a temporary memory, meaning that a primary purpose of memory 420 may not be long-term storage. Memory 420 may also refer to a volatile memory, meaning that memory 420 does not maintain stored contents when memory 420 is not receiving power. Examples of volatile memories include RAM, dynamic random access memories (DRAM), static random access memories (SRAM), and other forms of volatile memories known in the art. In some examples, memory 420 is used to store program instructions for execution by processors 410. Memory 420, in one example, is used by software applications. Generally, software applications refer to software applications suitable for implementing at least some operations of the methods as described herein.

Mass storage devices 430 can also include one or more transitory or non-transitory computer-readable storage media or computer-readable storage devices. For example, memory 420 can store database or digital media content such as digital products or other data pertaining to multi-client network services. In some embodiments, mass storage devices 430 may be configured to store greater amounts of information than memory 420. Mass storage devices 430 may be also configured for long-term storage of information. In some examples, mass storage devices 430 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Computing device 400 may also include zero or more input devices 460. Input devices 460 may be configured to receive input from a user through tactile, audio, video, or biometric channels. Examples of input devices 460 may include a keyboard, keypad, mouse, trackball, touchscreen, touchpad, microphone, video camera, image sensor, fingerprint sensor, or any other device capable of detecting an input from a user or other source, and relaying the input to computing device 400 or components thereof.

Output devices 450 may be configured to provide output to a user through visual or auditory channels. Output devices 450 may include a video graphics adapter card, display, such as liquid crystal display (LCD) monitor, light emitting diode (LED) monitor, or organic LED monitor, sound card, speaker, lighting device, projector, or any other device capable of generating output that may be intelligible to a user. Output devices 450 may also include a touchscreen, presence-sensitive display, or other input/output capable displays known in the art.

Computing device 400 can also include network interface 470. Network interface 470 can be utilized to communicate with external devices via one or more networks such as one or more wired, wireless, or optical networks including, for example, the Internet, intranet, local area network, wide area network, cellular phone networks (e.g., Global System for Mobile communications network, Long-Term Evolution communications network, packet switching communications network, circuit switching communications network), Bluetooth radio, and an IEEE 802.11-based radio frequency network, among others. Network interface 470 may be a network interface card, such as an Ethernet card, an optical transceiver, a radio frequency transceiver, or any other type of device that can send and receive information.

An operating system of computing device 400 may control one or more functionalities of computing device 400 or components thereof. For example, the operating system may interact with the software applications and may facilitate one or more interactions between the software applications and processors 410, memory 420, storage devices 430, input devices 460, output devices 450, and network interface 470. The operating system may interact with or be otherwise coupled to software applications or components thereof. In some embodiments, software applications may be included in operating system.

Thus, methods and systems for providing a multi-client network service have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for providing a multi-client network service, the system comprising:
   a server including at least one processor, a non-transitory computer-readable medium including computer-executable program instructions, and a network interface configured to operatively connect the server with a plurality of remote user devices; and
   wherein, when the computer-executable program instructions are executed by the at least one processor, the at least one processor of the server:
   provides the multi-client network service to a plurality of existing users over at least one data network, the multi-client network service involving digital media content;

receives a plurality of requests to join a multi-client network service from a plurality of new users such that the plurality of new users can access the multi-client network service similarly to how the plurality of existing users access the multi-client network service;

obtains a load metric from the plurality of requests to join the multi-client network service, wherein the load metric characterizes at least a traffic load on the multi-client network service;

collects the load metric to obtain historical data characterizing a demand in the multi-client network service over time;

analyzes the demand in the multi-client network service over time to predict a future load demand in the multi-client network service;

individually and independently issues at least one timestamp to the plurality of new users upon receipt of their respective plurality of requests to join the multi-client network service from the plurality of the new users, the at least one timestamp having an expiration time, the expiration time being extended by the at least one processor upon receiving, from the plurality of the new users, one or more retry requests to join the multi-client network service before the load metric meets a threshold load value;

calculates an estimated wait time for each of the plurality of new users based on the load metric, the future load demand, and the at least one timestamp of each of the plurality of new users, wherein respective wait messages include the estimated wait time individually calculated for each of the plurality of new users;

in response to determining that the load metric is above the threshold load value, causes delivery of a wait message to at least one of the plurality of new users and causes keeping the at least one of the plurality of new users in a wait mode for a predetermined period or until the load metric changes to meet or below the threshold value; and in response to determining that the load metric meets or is below the threshold load value, determines based on the at least one timestamp of the plurality of new users whether to enable their respective new users to join the multi-client network service.

2. A method for providing a multi-client network service, the method comprising:

providing, by a server, the multi-client network service to a plurality of existing users over at least one data network;

receiving, by the server, a plurality of requests to join a multi-client network service from a plurality of new users such that the plurality of new users can access the multi-client network service similarly to how the plurality of existing users access the multi-client network service;

obtaining, by the server, a load metric from the plurality of requests to join the multi-client network service, wherein the load metric characterizes at least a traffic load on the multi-client network service;

collecting the load metric, by the server, to obtain historical data characterizing a demand in the multi-client network service over time;

analyzing, by the server, the demand in the multi-client network service over time to predict a future load demand in the multi-client network service;

individually and independently issuing, by the server, at least one timestamp to each new user of a plurality of new users upon receipt of the requests to join the multi-client network service from the plurality of the new users, the at least one timestamp having an expiration time, the expiration time being extended by the at least one processor upon receiving, from the plurality of the new users, one or more retry requests to join the multi-client network service before the load metric meets a threshold load value;

calculating, by the server, an estimated wait time for each of the plurality of new users based on the load metric, the future load demand, and the at least one timestamp of each of the plurality of new users, wherein respective wait messages include the estimated wait time individually calculated for each of the plurality of new users;

in response to determining that the load metric is above the threshold load value, causes delivery of a wait message to at least one of the plurality of new users and causes keeping the at least one of the plurality of new users in a wait mode for a predetermined period or until the load metric changes to meet or below the threshold value; and in response to determining that the load metric meets or is below the threshold load value, determining based on the at least one timestamp of the plurality of new users whether to enable their respective new users to join the multi-client network service.

3. The method of claim 2, wherein the multi-client network service includes one or more of the following: a network multiplayer game, an online multiplayer game, and a virtual reality multiplayer game.

4. The method of claim 2, wherein further the multi-client network service includes one or more of the following: a video-on-demand service, a television broadcasting service, and a multiuser online entertainment service.

5. The method of claim 2, further comprising:
repeatedly determining, by the server, a current load capacity of the multi-client network service;
wherein the load metric is calculated based at least on the at least one timestamp associated with the plurality of new users and the current load capacity of the multi-client network service.

6. The method of claim 2, further comprising:
repeatedly determining, by the server, a current load capacity of the multi-client network service; and
dynamically updating, by the server, the threshold load value based on changes in the current load capacity of the multi-client network service.

7. The method of claim 2, further comprising:
when it is determined that the load metric meets or is above the threshold load value, determining, by the server, whether the at least one timestamp of each new user is above or below a second threshold value;
if it is determined that the at least one timestamp of a particular new user is above the second threshold value, cause keeping, by the server, the particular new user in the wait mode; and
if it is determined that the at least one timestamp of a particular new user is below the second threshold value, enabling, by the server, to join the multi-client network service by the particular new user.

8. The method of claim 2, wherein the enabling to join the multi-client network service by the at least one of the plurality of new users is on a first-come-first-served policy basis.

9. The method of claim 2, further comprising:
operatively activating one or more additional network resources to increase a capacity of the multi-client network service when it is determined that the load metric meets or is above the threshold load value.

10. The method of claim 9, further comprising:
enabling, by the server, to join the multi-client network service by the at least one of the plurality of new users when the one or more additional network resources are activated.

11. The method of claim 2, wherein, when it is determined that the load metric meets or is above the threshold load value, the plurality of existing users enjoy the multi-client network service without interruptions or degradation in a quality of service.

12. The method of claim 2, further comprising:
determining, by the server, a make of a remote user device for each of the plurality of new users; and
selectively enabling, by the server, to join the multi-client network service by at least one of the plurality of new users when it is determined that: the load metric meets or is above the threshold load value and the make of the remote user device of the at least one of the plurality of new users is one of a plurality of predetermined user device makes; and
causing delivery, by the server, of the wait messages to others of the plurality of new users, when it is determined that the load metric meets or is above the threshold load value, and keeping others of the plurality of new users in the wait mode until the load metric changes so as not to meet or be above the threshold load value, wherein the others of the plurality of new users are not associated with at least one of the plurality of predetermined user device makes.

13. The method of claim 2, wherein the predicting of the future load demand in the multi-client network service based on the historical data comprising applying a machine-learning algorithm to the historical data.

14. The method of claim 2, wherein the predicting of the future load demand in the multi-client network service based on the historical data comprising detecting, by the server, acceleration or deceleration of the load demand based on the historical data.

15. The method of claim 2, wherein the predicting of the future load demand in the multi-client network service based on the historical data comprising recognizing, by the server, one or more predetermined data patterns in the historical data.

16. A non-transitory processor-readable medium having instructions stored thereon, which when executed by one or more processors, cause the one or more processors to implement a method, the method comprising:
providing a multi-client network service to a plurality of existing users over at least one data network;
receiving a plurality of requests to join a multi-client network service from a plurality of new users such that the plurality of new users can access the multi-client network service similarly to how the plurality of existing users access the multi-client network service;
obtaining a load metric from the plurality of requests to join the multi-client network service, wherein the load metric characterizes at least a traffic load on the multi-client network service;
collecting the load metric to obtain historical data characterizing a demand in the multi-client network service over time;
analyzing the demand in the multi-client network service over time to predict a future load demand in the multi-client network service;
individually and independently issuing at least one timestamp to the plurality of new users upon receipt of their respective plurality of requests to join the multi-client network service, the at least one timestamp having an expiration time, the expiration time being extended by the at least one processor upon receiving, from the plurality of the new users, one or more retry requests to join the multi-client network service before the load metric meets a threshold load value;
calculating an estimated wait time for each of the plurality of new users based on the load metric, the future load demand, and the at least one timestamp of each of the plurality of new users, wherein respective wait messages include the estimated wait time individually calculated for each of the plurality of new users;
in response to determining that the load metric is above the threshold load value, causes delivery of a wait message to at least one of the plurality of new users and causes keeping the at least one of the plurality of new users in a wait mode for a predetermined period or until the load metric changes to meet or below the threshold value; and
in response to determining that the load metric meets or is below the threshold load value, determining based on the at least one timestamp of the plurality of new users whether to enable their respective new users to join the multi-client network service.

* * * * *